UNITED STATES PATENT OFFICE.

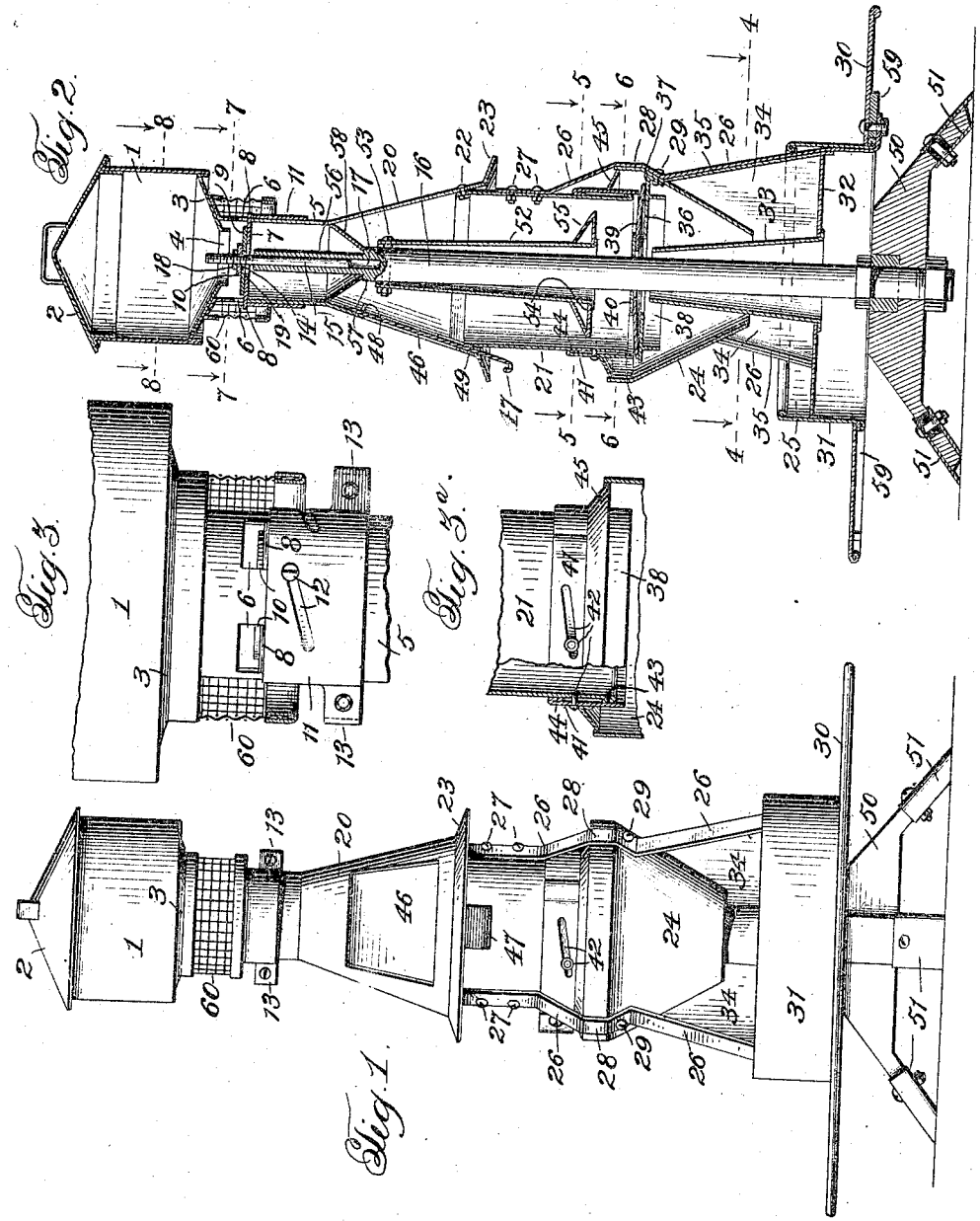

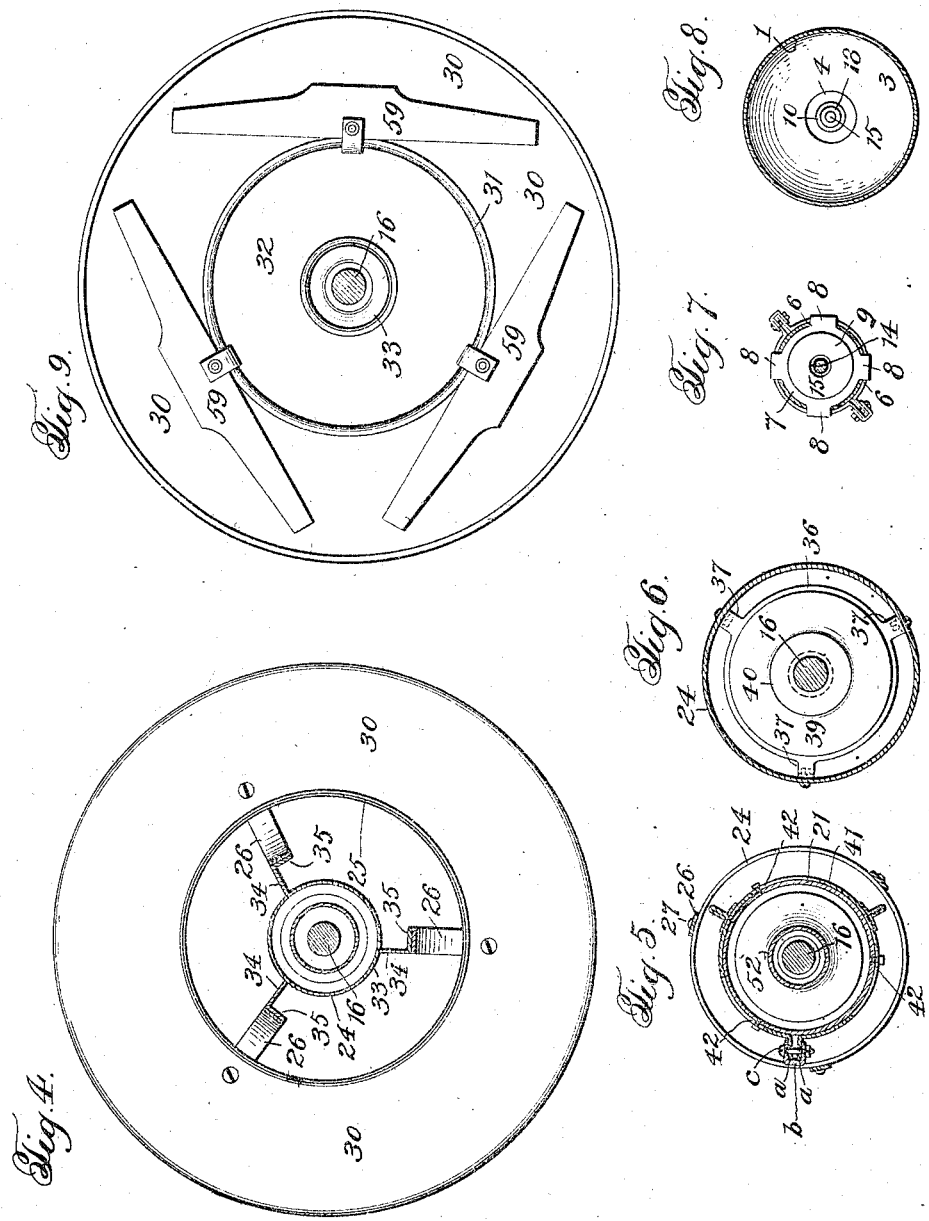

FRANK LOOMIS, OF MACHIAS, NEW YORK.

AUTOMATIC POULTRY FEEDER AND EXERCISER.

1,168,656.  Specification of Letters Patent.  Patented Jan. 18, 1916.

Application filed April 24, 1915. Serial No. 23,689.

*To all whom it may concern:*

Be it known that I, FRANK LOOMIS, a citizen of the United States, residing at Machias, in the county of Cattaraugus and State of New York, have invented certain new and useful Improvements in Automatic Poultry Feeders and Exercisers, of which the following is a specification, reference being had therein to the accompanying drawing.

This invention relates to an automatic poultry feeder and exerciser, and has for its primary object to associate an exerciser with certain devices and mechanism for controlling the distribution of scratch feed or grain, the machine being such as to scatter the grain on the ground surrounding said machine, and over a constantly varying radius; and furthermore has for its purpose to associate such exerciser with means for effecting the intermittent feeding of ground grain or other food stuff to one or more troughs suitably located upon the machine.

A further object of the invention is to provide an apparatus of this character, wherein the feed controlling means is required to be continuously oscillated or moved back and forth by the fowls in order to secure an intermittent feeding of both the scratch grain, ground grain or other food stuff; that is to say, mechanism in contradistinction to that class of poultry feeders which may be so operated and held by the fowls as to permit a continuous flow of grain from the hopper or other receptacle.

A still further object of the invention is the provision of an apparatus capable of being pivotally mounted or secured to a stationary post or standard, wherein all of the main parts of the apparatus, including the hoppers, feed controlling mechanism, and troughs, are adapted to be moved or oscillated to bring about the intermittent feeding of the grain when said apparatus is operated by the fowls as will be hereinafter more fully set forth.

It may also be stated that this invention has further for its object the provision of a poultry feeder which is simple and inexpensive in construction, efficient in every respect, also capable of easy operation and adapted to effectually control the feed of grain and other food stuffs in desired amounts.

With these and other objects in view, the invention consists in the construction and novel combination of parts hereinafter more fully set forth and claimed, it being understood that various changes in the form, proportion, size and minor details of construction, within the scope of said claims, may be resorted to without departing from the spirit or sacrificing any of the advantages of the invention.

In the drawings:—Figure 1 is a side elevation of an automatic poultry feeder and exerciser, constructed in accordance with this invention. Fig. 2 is a vertical sectional view of the same. Fig. 3 is an enlarged detail view, partly in section, and illustrating the feed controlling mechanism for the scratch grain. Fig. 3$^a$ is an enlarged detail view, partly in section, and illustrating the adjustable valve or sleeve of the feed controlling mechanism for the ground grain. Fig. 4 is a horizontal sectional view of the machine taken on the line 4—4 of Fig. 2. Fig. 5 is a horizontal sectional view on the line 5—5 of Fig. 2. Fig. 6 is a horizontal sectional view on the line 6—6 of Fig. 2. Fig. 7 is a horizontal sectional view on the line 7—7 of Fig. 2. Fig. 8 is a horizontal sectional view on the line 8—8 of Fig. 2, and Fig. 9 is a bottom plan view of the poultry platform, showing the strengthening strips for said platform.

Referring to the accompanying drawings which illustrate the preferred embodiment of the invention, 1 designates a feed hopper of cylindrical form, designed to be constructed of sheet metal or other suitable material, and provided at the top with a cover 2, and having a tapered lower portion 3, open at its lower end as indicated at 4. Depending from the tapered bottom portion 3 of the hopper 1, is a cylindrical neck 5, which is provided near its upper end with a plurality of grain discharge openings 6, said neck having communication with the hopper through the opening 4. Within this cylindrical neck is supported a disk 7 having projecting from its periphery a series of equally spaced lugs or projections 8, each one of said lugs projecting through one of the grain discharge openings in the cylindrical neck, thereby providing means for supporting the disk 7 within said neck. This disk 7, together with a feed controlling disk or plate 9 and a smaller disk or washer 10, both of which disks are superposed above the disk 7 and will be hereinafter more fully described, serve to support the grain contained within the hopper 1, thereby constituting in effect a bottom for said hopper.

Surrounding the neck 5 is an adjustable sleeve 11 having a pin and inclined slot connection with said neck as indicated at 12 in Fig. 3 of the drawings, so that as the sleeve is rotated it will be raised or lowered for adjusting the effective size of the grain discharge openings 6, and thus providing means whereby the desired regulation of the feed from the hopper 1 is accomplished. Hand grips 13 are provided upon the sleeve for facilitating the operation thereof.

It is to be noted that the lugs 8 project through the discharge openings 6 a sufficient distance so as to be engaged by the upper edge of the adjustable sleeve 11, in which case the disk 7, feed controlling disk 9, and washer 10, will be lifted as the sleeve is raised, and of course lowered as the sleeve is moved in a downward direction as will be obvious.

It is to be noted that the hopper and its depending neck, together with the disk 7 which is arranged in fixed relation to said neck so far as sidewise movement is concerned, are all capable of receiving a sidewise or oscillating movement in all directions with respect to the feed controlling disk 9, so that the disks 7 and 9 have a sliding engagement one with the other for effecting and controlling the discharge of grain from the hopper 1. It may also be stated that this feed controlling disk 9 is provided with a centrally located opening 14 through which passes a bolt or pin 15, removably carried by the upper end of a stationary post or standard 16 which supports the entire apparatus. This pin is inserted within a bore 17 in the standard as shown, and is screw threaded at its upper end to receive a nut 18 which is adapted to rest upon the upper surface of the washer 10. The opening 14 in the feed controlling disk 9 is made slightly larger than the diameter of the pin, and this for the purpose of allowing a limited oscillation of said disk with respect to the pin, brought about by the frictional engagement of said disk with the disk 7 at each operation of the machine. It is also to be noted that the bolt or pin passes through a centrally located opening 19 arranged in the disk 7, this opening being made relatively large to permit of the oscillation or back and forth movement of the upper part of the machine including the hopper 1 and its depending neck 5, with respect to the bolt or pin just referred to, which is stationary during the operation of the machine, being fixed to the standard as hereinbefore mentioned. The washer 10 snugly surrounds the bolt or pin, and is of sufficient size to cover up the central opening through the feed controlling disk 9, so that, as will be obvious, no matter what the position of the disk 7, feed controlling disk 9 and washer 10, may be with respect to one another, the openings through the disks will be closed to the passage of grain.

Depending from the lower end of the neck 5, and preferably formed as an integral extension thereof, is an outwardly tapering hood 20, from which depends a cylindrical casing constituting a hopper 21 for the ground feed or finely divided grain. This cylindrical casing preferably fits within the lower end of the hood 20 and is connected thereto near the lower end thereof by means of bolts or other fastenings means as indicated at 22. The extreme lower end of the hood 20 is flared as shown at 23, and this for the purpose of scattering the grain falling from the hopper 1 over a comparatively large area and causing the fowls to exercise in order to obtain the same.

A cylindrical funnel-shaped distributing member is indicated at 24, and is so associated and arranged with respect to the hopper 21, as to serve as a means for conveying the material discharged from said hopper, to a number of troughs 25 located directly below the same. The funnel distributing member 24 extends above the lower end of the cylindrical hopper 21, and is of a diameter greater than that of the hopper, so as to form an annular space between said lower end of the hopper and the inner surface of the funnel distributing member for permitting a free passage of the material from the hopper to the troughs 25 when the machine is oscillated. The lower end of the funnel distributing member, however, is smaller in diameter than the hopper 21, and said lower end is arranged directly above the feed troughs 25, being centrally located with respect thereto. As a mean for supporting the distributing member in fixed relation with respect to the lower end of the hopper 21, bracing bars or strips 26 are provided, the upper ends of which are securely fastened by bolts or other means to the sides of the hopper 21 at points indicated at 27, said strips intermediate their length being bent as indicated at 28, to conform to the shape of the upper end of the funnel distributing member to which they are securely fastened by bolts 29. The strips or bars are then extended downwardly and to a slight degree outwardly, and the lower end of each bar is secured to the feed troughs 25 and also to a circular platform 30, thus firmly holding all of the parts to which said strips are secured, namely, the hopper 21, funnel-shaped member 24, feed troughs 25, and platform 30, in fixed relation one with the other, substantially as shown in the drawings.

The feed troughs are constructed by providing a cylindrical section 31 forming the outer wall of the feed troughs, a bottom 32, and a tapered cylindrical member 33, which is carried by the bottom 32 and constitutes the inner wall for the feed troughs. In this connection it is to be noted that the bottom 32 has a centrally located opening therein to which the lower end of the tapered cylindrical member 33 is brazed or otherwise secured, and that the tapered member 33 extends upwardly from said bottom for a sufficient distance above the lower end of the funnel distributing member 24, so as to assure the delivery of the material from the hopper 21 to the feed troughs as above described. The separate feed troughs are formed by providing partitions 34 which extend between the inner and outer walls of the feed troughs 25, three of said partitions being shown in the present instance, said partitions extending upwardly from the bottom of the troughs and being of such shape at their upper edges as to conform to the side of the funnel distributing member. The outer edges of these partitions are bent at right angles to the main portion thereof to form flanges 35, which flanges are secured to the bracing bars or strips 26 as clearly shown in Fig. 4 of the drawing.

Below the lower end of the cylindrical casing constituting the hopper 21 is a cylindrical plate 36, the same being of a diameter slightly in excess of that of the hopper, said plate having angular lugs 37, extending from its periphery which are adapted to be fastened to the interior of the funnel distributing member 24 near the upper end thereof, and preferably by means of the same bolts 29, which secure the distributing member to the bracing strips. In this manner the plate 36 is secured in fixed relation with respect to the lower edge of the hopper 21, constituting a bottom for the same, it being understood, however, that sufficient space is left between the lower edge of the hopper and the bottom plate to allow for the discharge of the grain, contained within the hopper, over the outer edge of the plate and into the distributing member which delivers it to the feed troughs. An annular flange is indicated at 38 upon the under side of the plate 36 and serves as a strengthening means for said plate.

Supported by the bottom plate, and of a diameter slightly less than said plate is a feed controlling disk 39 of convexed form having a centrally located opening therein through which the post or standard passes. This opening is made larger than the diameter of the post, so that the convexed disk may have a slight sidewise or oscillating movement with respect to said post.

To prevent the contents of the hopper 21 from sifting through the central opening in the feed controlling disk 39, that is to say, between the disk and the post or standard, a disk or washer 40 is provided, the same being supported by the feed controlling disk and snugly fitting the post or standard, and also being of sufficient size as to completely cover the opening. It will, therefore, be understood that the discharge from the hopper 21, can only be made between the lower edge of the cylindrical casing constituting the hopper and the periphery or outer edge of the bottom plate 36, and as will be obvious, discharge of grain or other food stuff being brought about by the movement of the hopper and its bottom with respect to the feed controlling disk, similar to that heretofore set forth in connection with the feed controlling disk 9 for the scratch grain.

It may be stated that as the bottom is moved sidewise with respect to the feed controlling disk, a portion of the outer edge of said feed disk is caused to project over an adjacent portion of the periphery of the hopper bottom, so that a small amount of the grain contained within the hopper is permitted to discharge from said hopper and be conveyed by the distributer 24 into the troughs. Such operation will occur each time the apparatus is moved by the weight of the fowls alighting upon the platform, the apparatus being capable of sidewise movement in any direction, whereby the intermittent discharge of grain at all points around the feed controlling disk may be permitted.

In order to control the amount of grain discharged from the hopper 21 at each operation of the machine, an adjustable sleeve 41 is rotatably mounted upon the lower end of the hopper, a pin and inclined slot connection between the sleeve and hopper being provided, as shown at 42, so that as the sleeve is rotated, up and down movement is given thereto which allows said sleeve to be projected different distances below the lower edge of the hopper for varying the space between the hopper, and the feed controlling disk and bottom, thus regulating the amount of grain to be fed at each operation of the machine. The hopper at its lower edge is outwardly and upwardly bent to form a flange 43, and the sleeve at its upper edge is inwardly and downwardly bent to form a similar flange 44, thus materially strengthening these parts and serving to reduce the friction which would necessarily exist if the parts were in contact one with the other for their entire length. The sleeve is also provided with an outwardly and downwardly tapering flange as at 45, serving as a guard to prevent the fowls from getting any of the grain from the bottom of the hopper at this point. Furthermore, hand grips are arranged as clearly shown in Fig. 5 upon the outer surface of the sleeve 41 for the same purpose as those used in connection with the sleeve 11, and at this point it is to be noted that both of the sleeves 11 and 41 may be made of a single piece of metal having outwardly bent portions *a* at its ends connected together by a U-shaped piece *b* and bolt *c*, which parts, *a*, *b* and *c* constitute one of the hand grips. The other hand grips, two being illustrated, are preferably brazed or otherwise secured to the outer surface of the sleeve as clearly shown.

In the side of the tapering hood 20 is an enlarged opening through which the hopper 21 may be filled with the material to be fed to the fowls. This opening is normally closed by a sliding door 46, which may be moved to open position by sliding the same in a downward direction, a handle 47 being provided for this purpose. A pin or projection 48 at the upper end of the door is provided, which is adapted to coöperate with a strip 49 when the door is in open position, serving as a stop for limiting the downward movement of said door.

The entire machine, as has been stated, is supported upon a post or standard 16, said standard being mounted upon a block or base piece 50 having adjustable feet 51 secured thereto, thereby permitting the standard to be firmly positioned in proper relation to the ground upon which it is set. Near the upper end of the post is loosely pivoted a tapered member 52, said member surrounding the post and extending downwardly from said pivotal connection to within the hopper 21, the lower end of said tapered member being located near the bottom of said hopper. This pivotal connection is made by passing a bolt through the upper end of said tapered member and also the post as indicated at 53. Extending from the lower edge of the member 52 is a circular supporting member 54 having a downwardly inclined upper face 55, and this supporting member is provided for the purpose of sustaining the weight of the bulk of the material contained within the hopper 21, and thereby assuring the proper operation of the feed controlling means for the hopper 21.

It has been noted at various places throughout this description that the entire apparatus is supported or carried by a post or standard 16, and in this connection it may be further stated that all of the parts of the machine are preferably made of cylindrical form in cross section and the post arranged centrally with respect thereto. Furthermore, the post at its upper end has a somewhat reduced portion 56, thereby forming a shoulder 57, for receiving the lower edge of an inwardly tapering member 58 carried by the lower end of the neck 5. In this manner, it being borne in mind that the various parts of this apparatus are connected together as herein set forth, the entire machine is supported upon the post or standard, and capable of having a rocking or oscillating movement upon the shoulder 57 just referred to. It is also to be borne in mind that the tapering members 33 and 52 are formed in such a way, and also that sufficient space is provided between said members and the post or standard, to allow for such rocking movement of the machine.

The circular platform 19 is preferably provided upon its under side with cross strips 59, the same being secured thereto in any preferred manner, and serving to strengthen said platform.

A screen guard 60 is also provided, depending from the bottom of the hopper 1 and extending to a position below the feed discharge openings 6 in the depending neck 5, thus preventing the fowls from getting any of the grain from the hopper 1 at this point.

The apparatus being constructed and operated in a manner as herein described, it will be readily understood that said apparatus is such as to require the fowls to operate the same, and when such apparatus is operated certain of the grain will be scattered about the ground compelling the fowls to run about and scratch for their feed and thus get the exercise deemed necessary for them. Furthermore, and by each operation of the machine, a different kind of food, such for instance as finely divided grain, may be fed in small quantities to the troughs. It will, of course, be understood that the operation of the machine is brought about by the fowls alighting upon the circular platform, the weight of said fowls being sufficient to tilt or oscillate the apparatus, which tilting movement causes the feed controlling mechanism to operate for discharging the grain in small quantities. In other words, the grain is discharged intermittently or at such times as the machine is tilted or oscillated from one position to a different position. The machine cannot be held in any one position by the fowls, or in fact cannot be operated in such a manner as to allow a continuous flow of grain from either one of the hoppers. Such being the case, the fowls are required to tilt the machine back and forth in order to have grain discharged therefrom, thereby giving the fowls the desired amount of exercise.

I claim:

1. An automatic poultry feeder and exerciser, comprising a hopper, feed controlling mechanism for said hopper, and a post or standard for supporting said hopper and its associated parts, said hopper being capable of having an oscillating tiltable movement imparted thereto for operating the feed controlling mechanism.

2. An automatic poultry feeder and exerciser, comprising a hopper provided with a depending neck having lateral discharge openings therein, said hopper open at its bottom to permit discharge of material therefrom to said neck, feed controlling mechanism carried by said neck and constituting the bottom for said hopper, and a standard for supporting said hopper and its associated parts, all of said parts, including the hopper and the feed controlling mechanism, being capable of having an oscillating movement imparted thereto for ejecting the material contained within the hopper through said lateral openings in the neck.

3. An automatic poultry feeder and exerciser comprising a hopper provided with a depending neck having lateral discharge openings therein, said hopper open at its bottom to permit the discharge of material from said hopper to the neck, a disk carried by said neck and having lugs projecting through the lateral openings in said neck, a feed controlling plate supported by said disk and centrally located with respect thereto, said disk and feed controlling plate constituting the bottom for said hopper, and a standard for supporting said hopper and its associated parts, all of said parts including the hopper and the feed controlling mechanism being capable of having an oscillating movement imparted thereto for ejecting the material contained within the hopper, through said lateral openings in the neck.

4. An automatic poultry feeder and exerciser, comprising a hopper provided with a depending neck having lateral discharging openings therein, said hopper open at its bottom to permit the discharge of material from said hopper to the neck, feed controlling mechanism carried by said neck and constituting the bottom for said hopper, a standard for supporting said hopper and its associated parts, and a guard independent of the neck and its associated parts surrounding said neck and projecting at all times below the lateral openings in the neck, said guard being spaced from the neck to permit the discharge of material through the lateral openings.

5. An automatic poultry feeder and exerciser, comprising a standard, a hopper pivotally mounted upon said standard and open at its bottom to permit the discharge of material therefrom, a funnel distributing member arranged in fixed relation with respect to the lower end of said hopper, a plate fixed to the distributing member and constituting the bottom for the hopper, said plate being spaced from the lower edge of said hopper for a sufficient distance to permit the discharge of material from the hopper at the periphery of said bottom plate and into the distributing member, and a trough arranged in fixed relation with respect to the funnel distributing member and adapted to receive the material discharged therefrom, all of said parts excepting the standard being capable of having an oscillating movement imparted thereto for permitting the discharge of material from the hopper into the trough.

6. An automatic poultry feeder and exerciser, comprising a standard, a hopper pivotally mounted upon said standard and open at its bottom to permit the discharge of material therefrom, a funnel distributing member arranged in fixed relation with respect to the lower end of said hopper, a plate fixed to the distributing member and constituting the bottom for the hopper, said plate being spaced from the lower edge of said hopper for a sufficient distance to permit the discharge of material from the hopper at the periphery of said bottom plate and into the distributing member, a feed controlling disk having sliding engagement with the upper surface of said bottom plate, and a trough arranged in fixed relation with respect to the funnel distributing member and adapted to receive the material discharged therefrom, all of said parts excepting the standard being capable of having an oscillating movement imparted thereto for permitting the discharge of material from the hopper into the trough.

7. An automatic poultry feeder and exerciser, comprising a standard, a hopper mounted upon said standard and open at its bottom to permit the discharge of material therefrom, a plate arranged in fixed relation with respect to the lower edge of said hopper and being spaced therefrom for a sufficient distance to permit the discharge of material from the hopper at the periphery of said bottom plate, and a trough arranged below the hopper and adapted to receive the material discharged therefrom, all of said parts excepting the standard being capable of having an oscillating movement imparted thereto for permitting the discharge of material from the hopper into the trough.

8. An automatic poultry feeder and exerciser, comprising a standard, a hopper mounted upon said standard and open at its bottom to permit the discharge of material therefrom, a plate arranged in fixed relation with respect to the lower edge of said hopper and constituting the bottom for the same, said plate being spaced from said lower edge for a sufficient distance to permit the discharge of material from the hopper at the periphery of said bottom plate, a trough arranged in fixed relation with respect to the lower end of the hopper, and a platform surrounding the trough, all of said parts excepting the standard being capable of having an oscillating movement imparted thereto for permitting the discharge of material from the hopper into the trough.

9. An automatic poultry feeder and exerciser, comprising a standard, a hopper mounted upon said standard and open at its bottom to permit the discharge of material therefrom, a plate arranged in fixed relation with respect to the lower edge of the hopper and constituting the bottom for the same, said plate being spaced from the lower edge of said hopper for a sufficient distance to permit the discharge of material from the hopper at the periphery of said bottom plate, a trough arranged in fixed relation with respect to the bottom of the hopper, and a member carried by the standard and suspended within the hopper above the bottom thereof for supporting the bulk of the material contained within said hopper, all of said parts excepting the standard being capable of having an oscillating movement imparted thereto for permitting the discharge of material from the hopper into the trough.

In testimony whereof I affix my signature in presence of two witnesses.

FRANK LOOMIS.

Witnesses:
CREIGHTON H. MURPHY,
ADDISON M. BAKER.